United States Patent
Slaton et al.

(10) Patent No.: US 11,805,942 B1
(45) Date of Patent: Nov. 7, 2023

(54) MULTI-FUEL COOKER

(71) Applicants: Melvin Slaton, Pass Christian, MS (US); Wendy Slaton, Pass Christian, MS (US)

(72) Inventors: Melvin Slaton, Pass Christian, MS (US); Wendy Slaton, Pass Christian, MS (US)

(*) Notice: Subject to any disclaimer, the term of this patent is extended or adjusted under 35 U.S.C. 154(b) by 209 days.

(21) Appl. No.: 17/156,038

(22) Filed: Jan. 22, 2021

(51) Int. Cl.
| | |
|---|---|
| *A47J 37/07* | (2006.01) |
| *F24B 1/20* | (2006.01) |
| *F24C 3/14* | (2021.01) |
| *F24C 5/20* | (2021.01) |
| *F24B 1/22* | (2006.01) |
| *F22B 1/22* | (2006.01) |

(52) U.S. Cl.
CPC ....... *A47J 37/0727* (2013.01); *A47J 37/0745* (2013.01); *A47J 37/0786* (2013.01); *F24B 1/207* (2013.01); *F24B 1/22* (2013.01); *F24C 3/14* (2013.01); *F24C 5/20* (2013.01); *A47J 2037/0795* (2013.01)

(58) Field of Classification Search
CPC ............. A47J 37/0727; A47J 37/0745; A47J 37/0786; A47J 2037/0795; F24B 1/207; F24B 1/22; F24C 3/14; F24C 5/20
See application file for complete search history.

(56) References Cited

U.S. PATENT DOCUMENTS

| | | | | |
|---|---|---|---|---|
| 431,159 | A * | 7/1890 | Abrahamson | F24C 15/006 126/198 |
| 2,004,024 | A * | 6/1935 | Voorst, Jr. | F24C 3/027 126/41 D |
| 2,789,877 | A * | 4/1957 | Pfundt | A23B 4/052 426/235 |
| 2,826,984 | A * | 3/1958 | Krull | A47J 37/0704 126/25 R |
| 2,842,043 | A * | 7/1958 | Renland | A23B 4/052 99/393 |
| 3,223,022 | A * | 12/1965 | Powell | A23B 4/052 432/198 |
| 4,643,162 | A * | 2/1987 | Collins | A47J 37/0704 126/41 R |
| 5,891,498 | A * | 4/1999 | Boehler | A23B 4/052 126/41 R |
| 6,708,604 | B1 * | 3/2004 | Deichler, Jr. | A47J 37/0763 99/449 |
| 7,451,691 | B2 * | 11/2008 | Robertson | A21B 3/04 219/401 |
| 7,540,233 | B1 | 6/2009 | Grice | |

(Continued)

*Primary Examiner* — Michael G Hoang
*Assistant Examiner* — Logan P Jones
(74) *Attorney, Agent, or Firm* — George L. Williamson

(57) ABSTRACT

Method and apparatus for a portable outdoor cooker designed for use with multiple sources of fuel, including charcoal briquettes, wood, and gas/propane. The cooker is designed with an upright standing enclosure being generally rectangular shaped mounted on ground contacting wheels. The cooker is designed to be totally enclosed being a walled structure having front upper and lower doors which can be opened independently. The cooker includes a plurality of shelves so that various types of food items can be cooked simultaneously on the cooker and includes an electrical rotisserie unit mounted near the top of the interior of the cooker. A plurality of handles are provided on the walled enclosure of the cooker.

4 Claims, 3 Drawing Sheets

(56) References Cited

U.S. PATENT DOCUMENTS

| | | | |
|---|---|---|---|
| 7,703,386 B1 * | 4/2010 | Bourgeois | A47J 37/0713 99/482 |
| 8,061,348 B1 | 11/2011 | Rodriguez | |
| 8,272,375 B1 * | 9/2012 | Bourgeois | F24C 5/20 126/30 |
| 9,038,620 B2 | 5/2015 | Brown | |
| 9,351,607 B2 | 5/2016 | Pothetes | |
| 9,510,604 B2 | 12/2016 | Ahmed | |
| 2005/0121018 A1 | 6/2005 | Rosen | |
| 2012/0247448 A1 * | 10/2012 | Thibodeaux | A47J 37/07 126/25 R |
| 2017/0164783 A1 | 6/2017 | Sauerwein et al. | |

* cited by examiner

MULTI-FUEL COOKER

BACKGROUND OF THE INVENTION

Field of the Invention

The present invention relates generally to outdoor cookers, and more particularly, is concerned with a portable multi-fuel cooker for various applications.

Description of the Related Art

Devices relevant to the present invention have been described in the related art; however, none of the related art devices disclose the unique features of the present invention. In U.S. Pat. No. 7,540,233 dated Jun. 2, 2009, Grice disclosed a multi-use cooker. In U.S. Patent Application Publication No. US2017/0164783 dated Jun. 15, 2017, Sauerwein, et al., disclosed a multi-fuel cooking unit. In U.S. Pat. No. 8,061,348 dated Nov. 22, 2011, Rodriguez disclosed a fireplace oven. In U.S. Pat. No. 9,510,604 dated Dec. 6, 2016, Ahmed disclosed an outdoor cooker and smoker, and fuel combustor therefor. In U.S. Pat. No. 9,351,607 dated May 31, 2016, Pothetes disclosed an outdoor grill, oven and fire pit unit. In U.S. Patent Application Publication No. 2005/0121018 dated Jun. 9, 2005, Rosen disclosed a combination barbeque grill, smoker and fireplace. In U.S. Pat. No. 9,038,620 dated May 26, 2015, Brown disclosed a convertible mobile fire pit and cooker assembly.

While these devices may be suitable for the purposes for which they were designed, they would not be as suitable for the purposes of the present invention as hereinafter described. As will be shown by way of explanation and drawings, the present invention works in a novel manner and differently from the related art.

SUMMARY OF THE PRESENT INVENTION

The present invention discloses a portable outdoor cooker designed for use with multiple sources of fuel, including charcoal briquettes, wood, and gas/propane. The cooker is designed with an upright standing enclosure being generally rectangular shaped mounted on ground contacting wheels so that the cooker can be moved about from one location to another. Furthermore, the cooker is designed to be totally enclosed being a walled structure having front upper and lower doors which can be opened independently. The cooker includes a plurality of shelves so that various types of food items can be cooked simultaneously on the cooker and includes an electrical rotisserie unit mounted near the top of the interior of the cooker. The rotisserie unit is driven by an electrical motor mounted to the wall of the cooker so that the motor is on the outside of the unit where it can be cooled. A plurality of handles are provided on the walled enclosure of the cooker so that it can be moved about easily from one location to another.

An object of the present invention is to provide an outdoor cooker which is portable and can be easily moved about from one location to another using ground contacting wheels. A further object of the present invention is to provide an outdoor cooker which can be used to cook different types of food items either singularly or simultaneously. A further object of the present invention is to provide an outdoor cooker which is adapted to be used with multiple fuel sources, including charcoal briquettes and gas/propane. A further object of the present invention is to provide an outdoor cooker which can be easily operated by a user. A further object of the present invention is to provide an outdoor cooker which can be relatively easily and inexpensively manufactured.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
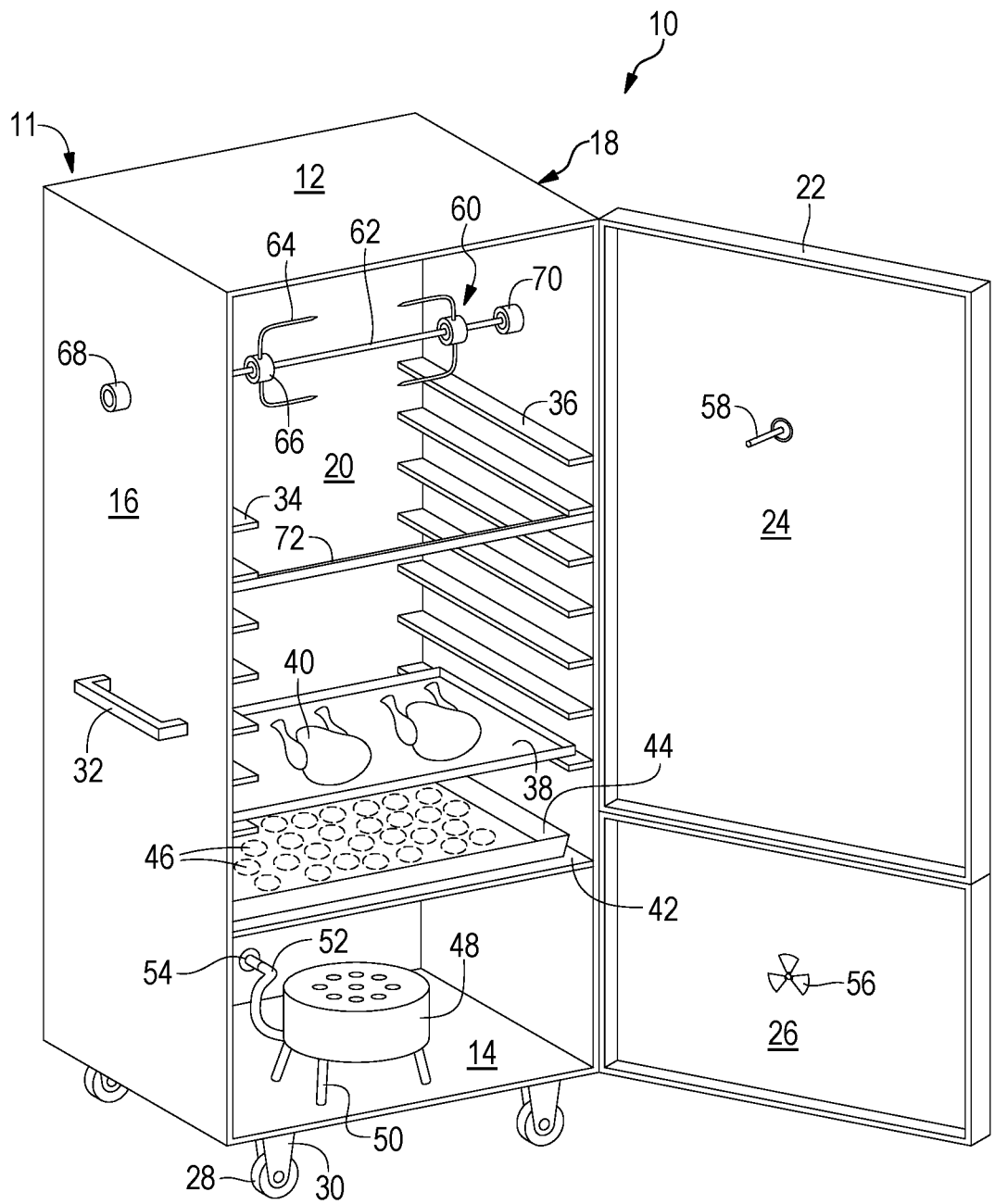
FIG. 1 is a perspective view of one embodiment of the present invention.

With regard to reference numerals used, the following numbering is used throughout the drawings.

10 present invention
11 enclosure
12 top wall
14 bottom wall
16 left wall
18 right wall
20 rear wall
22 front door
24 upper section of door
26 lower section of door
28 wheels
30 mounting bracket
32 handle
34 left support rail
36 right support rail
38 tray
40 food item
42 shelf
44 pan
46 charcoal briquette
48 gas/propane burner
50 support legs
52 gas/propane hose/line
54 connector
56 air vent
58 inner portion of thermometer
59 outer portion of thermometer
60 rotisserie
62 main center rod
64 fork
66 connector
68 left connector for wall
70 right connector for wall
72 cross member support
74 shelf
76 aperture
78 pot
80 liquid food item
82 motor
84 electrical cord
86 plug for electrical cord 88 hinge
90 air vent

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 4 illustrate the present invention wherein a portable outdoor cooker is disclosed and which is generally indicated by reference number 10.

Turning to FIG. 1, therein is shown the present invention 10 being an upright portable outdoor cooker having an enclosure 11 with a top wall 12, bottom floor/wall 14, left side 16, right side 18, a rear wall 20, and a front door 22 having an upper section 24 and a lower section 26. The enclosure 11 has a plurality of ground contacting wheels 28 disclosed on its bottom surface 14 so that the present invention 10 can be easily moved about from one location to another. The wheels 28 are mounted onto the bottom floor 14 section of the enclosure 11 using a mounting bracket 30. Also shown on the left wall is a first handle 32 which is designed to be grasped by the hand of a user for moving the present invention 10 from one location to another. Another handle is also disclosed for use with the present invention. Also shown on the interior of the present invention are a plurality of left 34 and right 36 support rails upon which trays 38 can be slidingly mounted wherein the trays 38 can have various types of food items 40 placed thereon so that the trays 38 can be easily placed/inserted into and removed from the enclosure 11 so that the food items can be easily placed inside the enclosure of the present invention 10 and then removed therefrom after the different food items are cooked to an acceptable degree. Also shown in the present invention 10 is a shelf 42 upon which a pan 44 containing a plurality of charcoal briquettes 46 can be placed so that the charcoal briquettes can serve as a first fuel source. Also shown on the interior of the present invention 10 is a second fuel source in the form of a removable gas/propane burner 48 supported on a plurality of legs 50 having a gas/propane inlet hose/line 52 running between the burner 48 and the rear wall 20 having a connector 54 for use in running the gas/propane supply hose through the rear wall 20 of the present invention 10. It can be seen that the gas/propane burner is mounted so as to be supported on the bottom wall 14 using a plurality of legs 50 and serves as an additional source of fuel for cooking the food items 40. The gas/propane burner 48 could be used either alone or in combination with the charcoal briquettes 46 which briquettes could also be used alone. Also shown on the interior of the present invention 10 is an air vent 56 which passes through the lower section of the front door 22 which is useful for supplying combustion air to the interior of the present invention 10. Also shown is the rear portion 58 of a thermometer which passes through the upper section 24 of the front door 22 which is useful to measure the temperature on the interior of the present invention 10. Also shown on the interior of the present invention 10 is a rotisserie generally indicated by reference numeral 60 which includes a main center support rod 62 along with a plurality of forks 64 upon which a food item can be mounted and which forks are attached to the central rod using a left and right connector 66 wherein the main rod is attached to the left wall 16 with a connector 68 which passes through the left wall 16 and a right connector 70 which passes through the right wall 18 of the present invention 10. Also shown is a cross bar support 72 which is used as a stiffener for the enclosure 11 of the present invention 10 and which extends across the front of the present invention 10 from the left wall 16 to the right wall 18 and is a structural support for strengthening the walls of the present invention 10.

Figure 2:
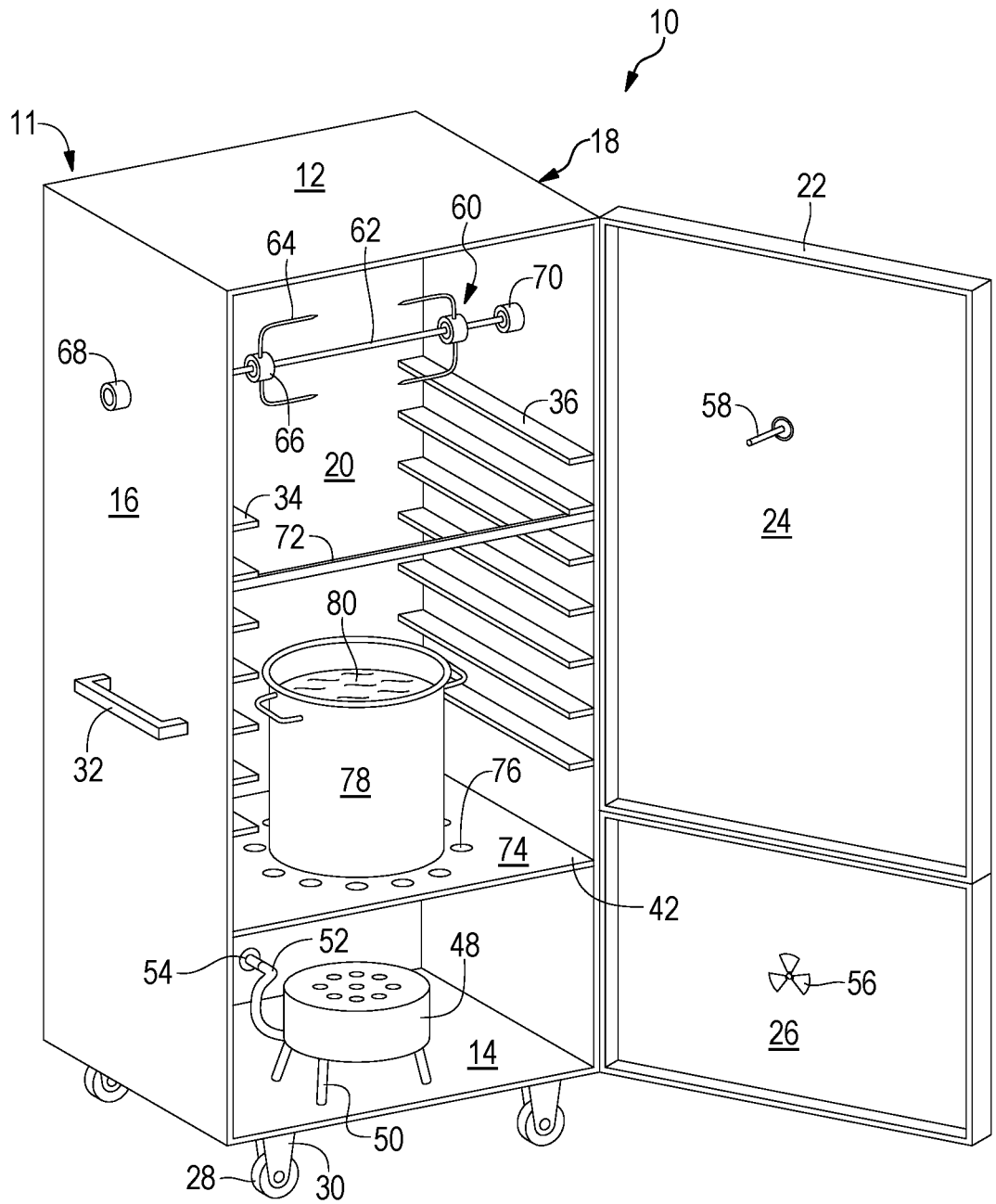
FIG. 2 is a perspective view of a second embodiment of the present invention.

Turning to FIG. 2, therein is shown another embodiment of the present invention 10 which is similar to the first embodiment of the present invention shown in FIG. 1, except that it provides an embodiment that is designed for use with the gas/propane burner 48 without using the charcoal briquettes as a fuel source so that the gas/propane burner is the single fuel source for the present invention 10. Shown therein is the present invention 10 having a support tray/shelf 74 which includes a plurality of apertures 76 therein which allow heat and flames from the gas/propane burner 48 to pass through the apertures for heating a pot 78 or the like containing a liquid item 80 or the like which can be prepared by a user of the present invention 10. Other previously disclosed elements are also shown.

Figure 3:
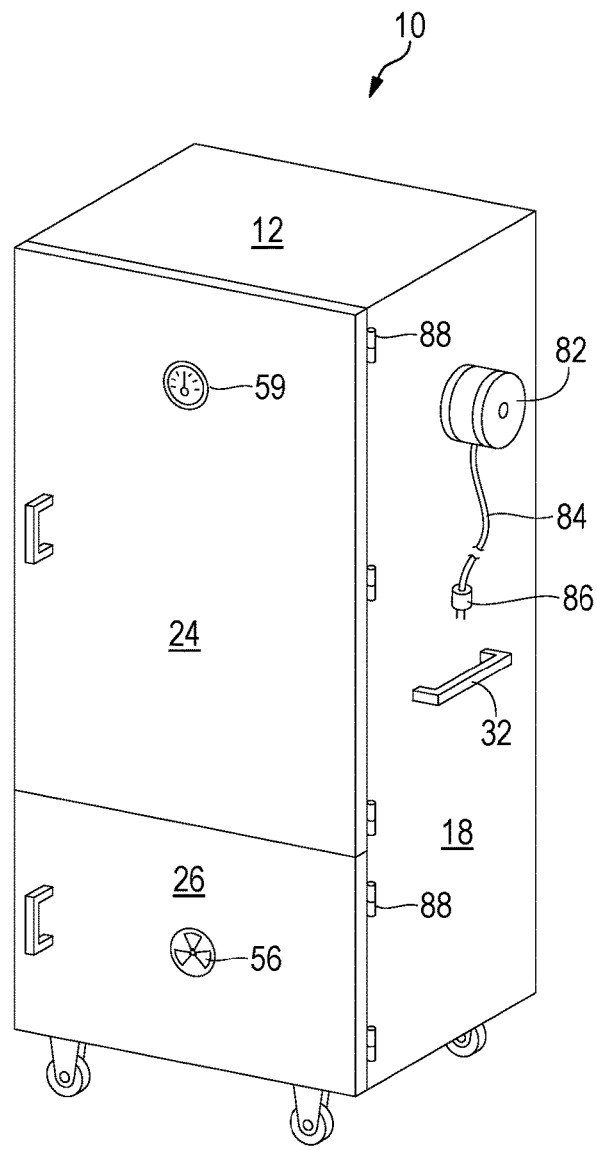
FIG. 3 is a perspective view of the front of the present invention.

Turning to FIG. 3, therein is shown the present invention 10 including the rotisserie electrical motor 82 mounted on right wall 18 including an electrical cord 84 with a wall outlet plug 86 on its end so that the present invention 10 can be moved about from one location to another and used with any available outlet to supply the electricity to operate the motor of the present invention. Also shown on present invention 10 are a plurality of hinges 88 which are used to connect the upper section 24 and lower section 26 of the front door 22 to the right wall 18 of the present invention 10 along with outer portion of the thermometer 59. An additional handle 32 is also shown for use by an operator of the present invention. Other previously disclosed elements are also shown.

Figure 4:
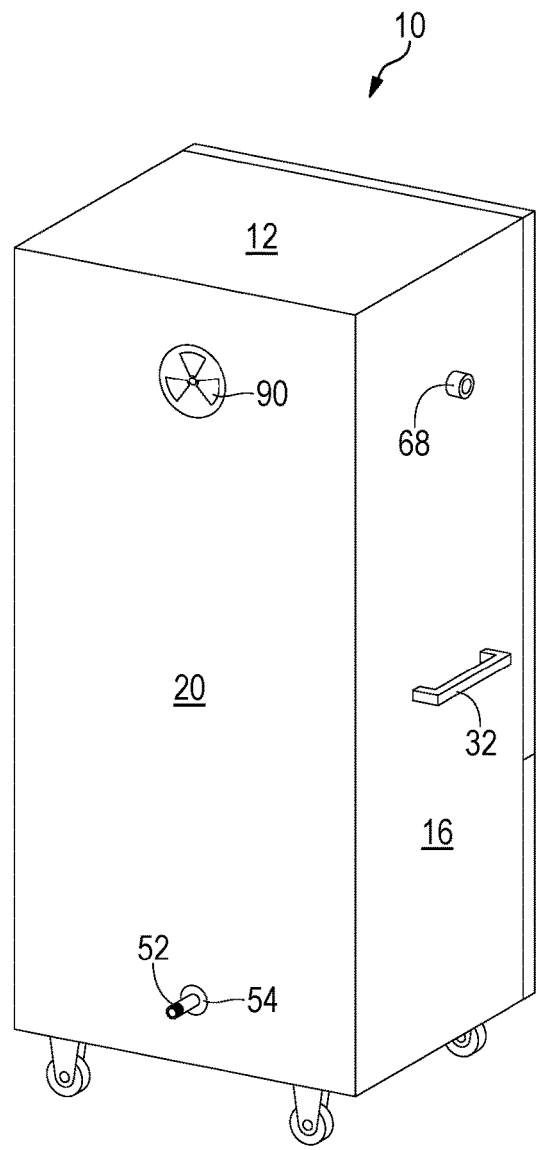
FIG. 4 is a perspective view of the rear of the present invention.

Turning to FIG. 4, therein is shown the rear wall 20 of the present invention 10 including an additional outlet air vent 90 which serves as a smoke stack disposed on an upper portion of the rear wall 20 of the present invention 10 along with gas hose/line 52 for connection to a source of gas/propane fuel. Other previously disclosed elements are also shown.

Additional information regarding the present invention 10 follows making reference to FIGS. 1-4. The present invention 10 is a multi-purpose outdoor unit having the ability to cook different food items 40 including to smoke meats, slow roast meats using a rotisserie, deep fry, open flame grill, griddle and bake items. The present invention 10 can be used for camping, catering, receptions, family cookouts, emergency kitchen, food warmer and stationery holder. The present invention 10 is a free standing, upright unit with wheels 28 making it movable and easy to clean. It is a two-door unit 24, 26 with twist locks and one sliding air vent 56 and a smoke stack 90. The present invention 10 can be used with charcoal 46, propane 48, wood, or wood chips to fuel the unit for cooking. The round propane burner 48 enables the flames to stay in the center of the cooker to be used as a fryer, boiler or add a griddle. The present invention 10 has the ability to slowly smoke meats or fast cook meats with charcoal 46, propane 48, wood chips, or a combination of charcoal and wood chips. The present invention 10 also has the ability to slowly rotisserie cook meats or vegetables and has the ability to hold six full size catering sheet pans. The present invention 10 can hold several sizes of boiling pots 78 sized from a recommended four to twenty-four quarts. It can also be used as a deep fryer. In the event of loss of power, the present invention 10 can prepare and hold food for a large group of people and can bake cakes, pies, biscuits, cornbread, and other baked items and also bake meats, casseroles, vegetables and more. Meats and vegetables can also be grilled on the open flames. The rotisserie cooks meats or vegetables with the ability to cook up to 14 pounds of meat and 5 pounds of vegetables. The exterior cabinet enclosure 11 and supporting brackets are made from stainless steel. The present invention 10 has a size of 27 inches deep, 63 inches tall and 18 inches wide. It has a high pressure nozzle for extra cooking pressure. The cooking burner and gasoline are made with hard to eliminate heavy rusting pipes which will give the cooker years of enjoyment. The top door is about 38×16 inches and the bottom door is 24×16 inches. The burner 48 height is about 8-10 inches from the bottom base 14. The charcoal 46 height from the burner 48 is about 3 inches from the burner. The bottom of door 24 height from the charcoal should be 6-8 inches above the charcoal. There may also be a support bar between the bottom 26 and the top door 24 frame. There also six-inch, hard plastic wheels 28. The rack support rails 34, 36 have 3 inches spacing with about 6-8 rows on each side.

We claim:

1. A portable outdoor cooker, comprising:
   a) an enclosure having a top wall, a bottom wall, left side wall, right side wall, rear wall, and a front door;
   b) said enclosure having a plurality of ground contacting wheels so that said enclosure is easily moved from one location to another;
   c) at least one said side wall having an outside handle for enabling a user to move said enclosure;
   d) said enclosure having an interior comprising an upper surface on said bottom wall, and a plurality of left and right side support rails mounted on interior surfaces of said left and right side walls for supporting trays slidably mounted within said enclosure for cooking food items;
   e) at least one shelf within said enclosure;
   f) a gas propane burner removably sitting on an upper surface of said bottom wall providing cooking heat for said outdoor cooker, and a pan containing combustible solid fuel on a shelf for providing additional cooking heat for said outside cooker, each source of heat being used either alone or in combination;
   g) a pot containing oil for deep frying on said shelf, said shelf located directly above said gas propane burner and having apertures therein;
   h) an electrically operated rotisserie mounted within an upper region of said enclosure directly above said pot containing oil, said rotisserie extending between said side walls, and an electric motor drive for said rotisserie mounted on an outside surface of one of said side walls;
   i) said enclosure having a sliding air vent and a thermometer extending into said enclosure through an upper portion of said front door: and
   j) a cross bar used as a stiffener extending across a front of said enclosure from said left side wall to said right side wall for providing structural support and strengthening said walls of said enclosure.

2. The outdoor cooker of claim 1, in which said enclosure is made of stainless steel.

3. A method of outdoor cooking, comprising the steps of:
   a) providing an enclosure having a top wall, a bottom wall, left side wall, right side wall, rear wall, and a front door;
   b) providing a plurality of ground contacting wheels for said enclosure so that said enclosure is easily moved from one location to another;
   c) providing at least one of said side walls with an outside handle for enabling a user to move said enclosure;
   d) providing said enclosure with an interior comprising an upper surface of said bottom wall, and a plurality of left and right side support rails mounted on interior surfaces of said left and right side walls for supporting trays slidably mounted within said enclosure for cooking food items;
   e) providing at least one shelf within said enclosure;
   f) providing a gas burner supported on legs removably sitting on an upper surface of said bottom wall as a source of heat for providing cooking heat for said outdoor cooker;
   g) providing another source of heat for cooking within said enclosure comprising a pan containing a combustible fuel on a shelf located directly above said gas burner;
   h) providing an electrically operated rotisserie mounted within an upper region of said enclosure, said rotisserie extending between said side walls and an electric motor drive for said rotisserie mounted on an outside surface of one of said side walls;
   i) using one of said handles to move said outdoor cooker to a selected location for cooking food items;
   j) opening said door and placing food items on at least one of said supporting trays and/or said rotisserie;
   k) starting either said gas burner or the burning of said combustible fuel;
   l) cooking said food items until ready for consumption; and
   m) using said burner and combustible fuel for cooking, either each alone or in combination with each other;
   n) providing said enclosure with a sliding air vent in a bottom portion of said front door and a thermometer extending through and upper portion of said front door to measure temperature within an interior of said enclosure;
   o) providing a cross bar as a stiffener extending across a front of said enclosure from said left side wall to said right side wall for providing structural support and strengthening said walls of said enclosure; and
   p) placing a got containing oil on said shelf, using said pot containing oil for deep frying, said shelf having apertures therein, and said electrically operated rotisserie mounted directly above said pot containing oil.

4. The method of claim 3, in which there is provided a hose line for said gas burner extending out through a wall of said enclosure.

* * * * *